(12) United States Patent
Deuber

(10) Patent No.: US 12,161,252 B2
(45) Date of Patent: Dec. 10, 2024

(54) UNIT FOR A COFFEE DEVICE

(71) Applicant: Creatrix AG, Herisau (CH)

(72) Inventor: Louis Deuber, Richterswil (CH)

(73) Assignee: Creatrix AG, Herisau (CH)

( * ) Notice: Subject to any disclaimer, the term of this patent is extended or adjusted under 35 U.S.C. 154(b) by 906 days.

(21) Appl. No.: 17/058,711

(22) PCT Filed: Feb. 11, 2019

(86) PCT No.: PCT/EP2019/053323
§ 371 (c)(1),
(2) Date: Nov. 25, 2020

(87) PCT Pub. No.: WO2019/228681
PCT Pub. Date: Dec. 5, 2019

(65) Prior Publication Data
US 2021/0219770 A1    Jul. 22, 2021

(30) Foreign Application Priority Data

May 31, 2018   (EP) ..................................... 18175384
Oct. 5, 2018   (EP) ..................................... 18198887
Oct. 5, 2018   (EP) ..................................... 18198888

(51) Int. Cl.
*A47J 31/42*  (2006.01)
*A47J 31/40*  (2006.01)
*A47J 42/50*  (2006.01)

(52) U.S. Cl.
CPC ............... *A47J 31/42* (2013.01); *A47J 31/40* (2013.01); *A47J 42/50* (2013.01)

(58) Field of Classification Search
CPC ............. A47J 31/42; A47J 31/40; A47J 31/50
See application file for complete search history.

(56) References Cited

U.S. PATENT DOCUMENTS 2,584,781 A     2/1952   Beatty
4,961,517 A *  10/1990   Tkac ...................... A23G 3/203
                                                          383/111
4,961,521 A *  10/1990   Eckman ................ A47G 19/24
                                                          222/545
(Continued)

FOREIGN PATENT DOCUMENTS

CN       1449349 A   10/2003
CN     102395304 A    3/2012
(Continued)

*Primary Examiner* — Sean M Michalski
(74) *Attorney, Agent, or Firm* — The Webb Law Firm

(57) ABSTRACT

A unit includes a container module with a coffee bean container and a portioning device for metering coffee beans. The module as a whole is configured for connection to a coffee apparatus, the connection enabling a metered delivery of coffee beans from the module into a grinder. The coffee bean container is tightly closed prior to the first use and, after an opening operation, has an opening through which coffee beans enter into the portioning device. The coffee bean container is coupled with the portioning device in a releasable and reconnectable manner by use of a coupling element. The opening can be closed again when the coffee bean container is separated from the portioning device. The unit makes it possible to handle and enjoy coffee in a cost-effective and environmentally aware manner.

18 Claims, 6 Drawing Sheets

(56) References Cited

U.S. PATENT DOCUMENTS

| | | | | |
|---|---|---|---|---|
| 5,201,474 A * | 4/1993 | Midden | | A47J 42/20 |
| | | | | 241/246 |
| 5,542,583 A * | 8/1996 | Boyer | | G01F 11/46 |
| | | | | 222/445 |
| 6,339,985 B1 * | 1/2002 | Whitney | | A47J 31/505 |
| | | | | 99/290 |
| 7,350,455 B2 | 4/2008 | Vetterli | | |
| 7,451,901 B2 * | 11/2008 | Ranney | | G01F 11/261 |
| | | | | 222/450 |
| 7,934,670 B2 | 5/2011 | Ford | | |
| 8,556,199 B2 | 10/2013 | van Os et al. | | |
| 8,783,164 B2 | 7/2014 | Tanja et al. | | |
| 9,011,955 B2 | 4/2015 | de Graaff et al. | | |
| 9,339,141 B2 * | 5/2016 | Van Os | | A23F 5/262 |
| 9,510,710 B1 * | 12/2016 | Kaminski | | A47J 42/44 |
| 9,854,944 B2 * | 1/2018 | Ohta | | A47J 42/02 |
| 9,980,599 B2 | 5/2018 | Van Os et al. | | |
| 2002/0153438 A1 | 10/2002 | Glucksman et al. | | |
| 2003/0150748 A1 | 8/2003 | Crawley | | |
| 2003/0205584 A1 * | 11/2003 | Niggemyer | | B65D 75/5883 |
| | | | | 222/107 |
| 2005/0017107 A1 | 1/2005 | Steckhan | | |
| 2006/0201339 A1 | 9/2006 | Vetterli | | |
| 2006/0204353 A1 * | 9/2006 | Bonerb | | B65B 69/0091 |
| | | | | 414/412 |
| 2007/0000943 A1 * | 1/2007 | Morgan | | B65D 35/38 |
| | | | | 222/107 |
| 2010/0308141 A1 * | 12/2010 | Bich | | A47J 42/50 |
| | | | | 241/301 |
| 2011/0220242 A1 * | 9/2011 | Yang | | B29C 48/08 |
| | | | | 141/69 |
| 2011/0256273 A1 * | 10/2011 | de Graaff | | A47J 42/50 |
| | | | | 426/106 |
| 2012/0070546 A1 * | 3/2012 | Tanja | | A47J 31/42 |
| | | | | 426/115 |
| 2012/0118165 A1 * | 5/2012 | Van Os | | G01F 15/06 |
| | | | | 222/548 |
| 2013/0058744 A1 * | 3/2013 | Mothersbaugh | | B65B 69/0083 |
| | | | | 222/105 |
| 2013/0091802 A1 * | 4/2013 | Bentley | | A47J 42/50 |
| | | | | 53/111 R |
| 2013/0095218 A1 | 4/2013 | de Graaff et al. | | |
| 2013/0095219 A1 * | 4/2013 | de Graaff | | A47J 31/404 |
| | | | | 99/286 |
| 2013/0099028 A1 * | 4/2013 | Richard | | A01C 15/02 |
| | | | | 239/668 |
| 2013/0101717 A1 | 4/2013 | de Graaff et al. | | |
| 2013/0115342 A1 | 5/2013 | Van Os et al. | | |
| 2013/0115351 A1 * | 5/2013 | Van Os | | A23F 5/262 |
| | | | | 426/433 |
| 2014/0202581 A1 | 7/2014 | Tanja et al. | | |
| 2014/0361107 A1 | 12/2014 | Steiner | | |
| 2015/0118367 A1 | 4/2015 | Os et al. | | |
| 2015/0157166 A1 | 6/2015 | Van Os et al. | | |
| 2015/0201796 A1 * | 7/2015 | Kuempel | | A47J 31/52 |
| | | | | 99/283 |
| 2016/0058244 A1 | 3/2016 | Laffi | | |
| 2016/0236231 A1 * | 8/2016 | Chastine | | B65G 11/206 |
| 2016/0316957 A1 * | 11/2016 | Tran | | C02F 1/003 |
| 2016/0338525 A1 * | 11/2016 | Fain | | A47J 31/002 |
| 2016/0367072 A1 * | 12/2016 | Boone | | A47J 43/046 |
| 2017/0174418 A1 | 6/2017 | Cai | | |
| 2019/0039821 A1 * | 2/2019 | Brussa | | B65D 88/1618 |
| 2020/0069106 A1 * | 3/2020 | Zimmermann | | A47J 31/42 |
| 2020/0163487 A1 * | 5/2020 | Kihara | | G07F 13/00 |
| 2020/0315401 A1 | 10/2020 | Deuber et al. | | |
| 2021/0221667 A1 * | 7/2021 | Venkatakrishnan | | |
| | | | | G06Q 20/209 |
| 2021/0307559 A1 * | 10/2021 | Kihara | | G06T 7/0004 |
| 2021/0361119 A1 * | 11/2021 | Valsecchi | | A47J 42/50 |
| 2021/0386245 A1 * | 12/2021 | Dayton | | A23F 5/105 |

FOREIGN PATENT DOCUMENTS

| | | |
|---|---|---|
| CN | 102525271 A | 7/2012 |
| CN | 102970907 A | 3/2013 |
| CN | 104274077 A | 1/2015 |
| CN | 105007785 A | 10/2015 |
| CN | 105395057 A | 3/2016 |
| CN | 207506451 U | 6/2018 |
| DE | 9308402 U1 | 2/1994 |
| DE | 202007015307 U1 | 12/2007 |
| DE | 202009013642 U1 | 1/2010 |
| DE | 102011076247 A1 | 11/2012 |
| EP | 1964498 A1 | 9/2008 |
| EP | 2087820 A1 | 12/2008 |
| EP | 2116161 A1 | 11/2009 |
| FR | 2565088 A1 | 12/1985 |
| FR | 2755431 A1 | 5/1998 |
| GB | 2438803 B | 11/2008 |
| JP | S597153 U | 1/1984 |
| JP | 20116088 A | 1/2011 |
| JP | 2014530684 A | 11/2014 |
| JP | 2015204958 A | 11/2015 |
| JP | 2017500091 A | 1/2017 |
| JP | 2018512050 A | 5/2018 |
| NL | 2007826 C2 | 5/2013 |
| RU | 2521732 C2 | 7/2014 |
| RU | 2561027 C2 | 8/2015 |
| WO | 0228244 A1 | 4/2002 |
| WO | 2004098361 A1 | 11/2004 |
| WO | 2006070257 A2 | 7/2006 |
| WO | 2010001428 A2 | 1/2010 |
| WO | 2010033023 A2 | 3/2010 |
| WO | 2010064902 A3 | 6/2010 |
| WO | 2010064912 A2 | 6/2010 |
| WO | 2010095937 A1 | 8/2010 |
| WO | 2011102715 A2 | 8/2011 |
| WO | 2011102720 A2 | 8/2011 |
| WO | 2013078437 A1 | 5/2013 |
| WO | 2013048707 A1 | 4/2014 |
| WO | 2015077367 A2 | 5/2015 |
| WO | 2016113258 A1 | 7/2016 |
| WO | 2019122397 A1 | 6/2019 |

* cited by examiner

UNIT FOR A COFFEE DEVICE

CROSS-REFERENCE TO RELATED APPLICATIONS

This application is the United States national phase of International Application No. PCT/EP2019/053323 filed Feb. 11, 2019, and claims priority to European Patent Application Nos. 18175384.9 filed May 31, 2018, 18198887.4 filed Oct. 5, 2018, and 18198888.2 filed Oct. 5, 2018, the disclosures of which are hereby incorporated by reference in their entirety.

BACKGROUND OF THE INVENTION

Field of the Invention

The present invention relates to a unit for a coffee apparatus. The unit comprises a container module and a lid, wherein the container module comprises at least one coffee bean container and a portioning device.

Description of the Related Art

Coffee is a natural stimulant which requires expert preparation. In order for coffee to be able to develop its aroma in an optimal manner, the coffee beans should for example always be ground just immediately prior to the preparation of the coffee. Since not everyone has a preference for the same kinds of coffee beans, it is also desirable to be able to change between different kinds of coffee as quickly and simply as possible.

Depending on the type of coffee, i.e. espresso or lungo, a different quantity of coffee beans is required. Some coffee machines therefore have portioning devices which supply a predefined quantity of coffee beans to the grinder or which weigh the freshly ground coffee grounds.

Furthermore, the correct grinding degree is very important in order for all of the aromatic substances to develop in an optimal manner. As a rule, in fully automatic coffee machines, coffee powder from espresso beans and for example from white coffee beans or else from lungo beans is produced with the same degree of fineness. However, it is very important that the corresponding beans, be they dark or light roast, are also ground with the correct grinding degree.

In the unpublished international patent application PCT/EP2018/086732, the content of which is incorporated here by reference, a unit of a coffee apparatus is described. Said unit has a coffee bean container for storing the coffee beans, a portioning device for metering the coffee beans for a coffee beverage, and a grinder for grinding the metered coffee beans. The coffee bean container and the portioning device are configured in a common container module. The unit has a module receptacle, to which the container module, when in use, can be connected and from which said container module, after use, can be removed. The container module has user-selectable settings of a metered quantity and of a grinding degree, wherein the setting of the metered quantity affects the portioning device and the setting of the grinding degree affects the grinder. The coffee apparatus described therein is for example a coffee machine having a brewing apparatus or a coffee mill, in particular for the preparation of single portions. Depending on the embodiment, it is also suitable for the preparation of double portions. As an alternative or in addition, other embodiments make it possible to prepare multiple portions.

Since the settings with respect to the grinding degree and with respect to the metering are set directly on the container module, said settings are fixedly associated with the kind of coffee beans with which the bean container is filled. Since these settings are taken into account and implemented, without further action on the part of the user, when the container module is connected to the rest of the coffee machine, said settings do not need to be reset on the machine with every renewed use of said kind of coffee. The handling is thus simple and guarantees consistent coffee quality.

Said unit therefore always provides a freshly ground coffee without adversely affecting the aroma. It is possible to change the kind of beans in a simple manner, since merely the container module has to be exchanged. The settings on the coffee machine can be changed in a simple and bean-dependent and user-dependent manner, wherein parameters which have been set once for one kind of coffee no longer need to be set during subsequent use of the machine, even if another kind of coffee has been brewed in between. Since the container module does not need to have any electronic components, it can be produced in a relatively cost-effective manner. In other embodiments, in particular for the gastronomy sector or for machines in a higher price range, the container module also has electronic components.

The container modules described in these two unpublished applications thus have great potential. However, they give too little consideration to how the container modules are filled and stored.

SUMMARY OF THE INVENTION

It is therefore an object of the invention to optimize the container module.

The unit according to the invention has at least one container module. The container module comprises at least one coffee bean container and a portioning device for metering coffee beans, wherein the container module as a whole is configured for connection to a coffee apparatus. Said connection makes possible a metered delivery of coffee beans from the container module into a grinder of the coffee apparatus. The coffee bean container filled with coffee beans is tightly closed prior to a first use and, after an initial opening operation, said container has an opening through which coffee beans enter into the portioning device. In this case, during intended use of the container module with a coffee apparatus, the coffee bean container is arranged over the portioning device. The coffee bean container is coupled with the portioning device in a releasable and reconnectable manner. A coupling element is arranged around the opening, said element being used for connection to the portioning device, wherein the opening can be closed again when the coffee bean container is separated from the portioning device.

By virtue of said releasable connection of coffee bean container and portioning device, it is possible for the coffee beans to be provided already in a prefabricated container. Prior to use, the consumer needs merely to establish the connection to the portioning device. In addition, when not in use, it is not necessary for the entire container module to be stored in the refrigerator or at another suitable location. The coffee bean container can be removed from the portioning device again and can be tightly closed by way of its lid until the next use. Furthermore, the portioning device can be used multiple times, even if the coffee bean container is formed as a disposable packaging. However, the coffee bean container can preferably likewise be used several times. By way of example, the container can also be refilled again at a coffee supplier, for example a roaster.

Preferably, the coffee bean container is manufactured from a stiff or semi-stiff material. Preferably, the coffee bean container is manufactured from metal, glass or PET. In other embodiments, the coffee bean container has a soft or flexible main body. By way of example, said coffee bean container is a coffee pouch or a bag. The main body is connected to the coupling element in a fixed or releasable manner. By way of example, said coupling element is a threaded ring, which can be fastened to the coffee pouch or to the bag or has already been fastened, at the point of sale, to the coffee pouch or to the bag.

Said simple releasable connection is possible since the coffee bean container does not need to be plugged directly onto the coffee machine or onto the coffee mill. In this case, specifically during the plugging-on operation, the opening would be directed downward in an unprotected manner and the coffee beans would fall out. In the apparatus according to the invention, the coffee bean container, with upwardly directed opening, can be connected to the overturned portioning device, and the assembled container module must only then be turned over for mounting on the coffee apparatus. The opening is then protected by the portioning device, and the coffee beans held in the module.

In a simple embodiment, the container filled with coffee beans is covered, sealed or welded with a film, or closed in some other way. After separation from the portioning device, said container can likewise be closed again. This can in turn be carried out, for example, by adhesive bonding, welding, folding over container edges, or in another manner.

However, in a preferred embodiment, the unit has a lid for closing the container. Depending on the embodiment, said lid is used for closing purposes only after the first use or already prior to the first use.

In a simple embodiment, the lid is a removable air-tight and aroma-tight film. In another embodiment, the lid can be pushed back onto the coffee bean container in an air-tight manner. In other embodiments, a second coupling element is present for the tight connection. In preferred embodiments, the coupling element which is used for connection to the portioning device is also used for the tight connection to the lid.

In a preferred embodiment, the coupling element is a first thread, and the portioning device has a matching second thread which can be brought into engagement with the first thread. This is a simple, stable and cost-effective type of connection. Preferably, the lid has a third thread which can be brought into engagement with the first thread. This also minimizes the production costs and is also simple to handle.

Preferably, the coffee bean container is of closed configuration, except for the opening. Preferably, the base which lies opposite is thus closed and cannot be removed in a destruction-free manner. In other embodiments, said base likewise has a removable lid. In a preferred embodiment, the container is of substantially circular cylindrical configuration. It preferably has an internal diameter. These configurations make it possible to produce a simple and cost-effective container. Preferably, said container is configured, together with the lid, so as to be stackable. In a preferred embodiment, said container has the form of a plain jam jar, wherein the dimensions of said container also correspond approximately to a jar of this kind. The storage capacity thereof is preferably 100 g to 250 g and more preferably about 160 g.

Preferably, the portioning device substantially has a circular cylindrical outer contour. Preferably, the outer contours of the portioning device and of the coffee bean container are aligned, or the coffee bean container has a slightly smaller external diameter.

The portioning device can be configured in various ways. Depending on the embodiment, it corresponds to one of the portioning devices known from the prior art. However, it preferably corresponds to a portioning device as has been described and disclosed in the unpublished European patent applications mentioned in the introduction. Said portioning device therefore preferably has a first setting means, preferably a first setting ring, by means of which a metering of the coffee beans can be manually selected. In the interior, said portioning device preferably has a metering chamber for this purpose, which can be varied in terms of its capacity by way of the first setting means.

In a simple embodiment, the container module is composed of the coffee bean container and the portioning device. However, in preferred embodiments, the container module furthermore has a grinding degree setting device for the selectable setting of the grinding degree. When the container module is connected to the grinder, the grinding degree setting device affects the grinder. The portioning device is preferably arranged between the coffee bean container and the grinding degree setting device. The grinding degree setting device preferably has a second setting means, preferably a second setting ring, by means of which the grinding degree can be manually selected. However, the grinding degree device can also be realized by other means. By way of example, the container module can be provided with an RFID tag with data for the setting of the grinding degree, and the coffee apparatus has a corresponding reader. Different types of grinding degrees setting devices can be used. Preferably, grinding degree setting devices as have been described in the unpublished EP applications mentioned in the introduction are used. In the variants described therein, manual setting by way of the setting means, in particular the setting ring, is also preferred.

The grinder is preferably designed, and/or is preferably operated, such that, after each grinding operation, it is emptied completely and no ground coffee powder remains in the grinder. Solutions for this are well known and are therefore not described in detail here.

The entire container module preferably has a substantially cylindrical outer contour. If a grinding degree setting device is present, said portion preferably also has said outer contour. This results in a simple, space-saving design, which increases the flexibility in the development of new coffee apparatuses and which makes it possible to store the container modules in a simple manner when they are not in use.

The coffee bean container of such a unit according to the invention is preferably of circular cylindrical and one-piece configuration, having a closed base and having the opening opposite the base. The opening is surrounded by an external thread, and the lid has a matching internal thread.

In another preferred embodiment, the coffee bean container is a bag having an edge which surrounds an opening of the coffee bean container, wherein the coupling element has a lower ring for connection to the portioning device and an upper ring and wherein the edge of the coffee bean container, in the open state of the coffee bean container, is held in a clamped manner between the upper and the lower ring.

BRIEF DESCRIPTION OF THE DRAWINGS

A preferred embodiment of the invention is described below with reference to the drawings, which serve merely for explanation and are not to be interpreted as limiting. In the drawings.

DESCRIPTION OF PREFERRED EMBODIMENTS

Figure 1:
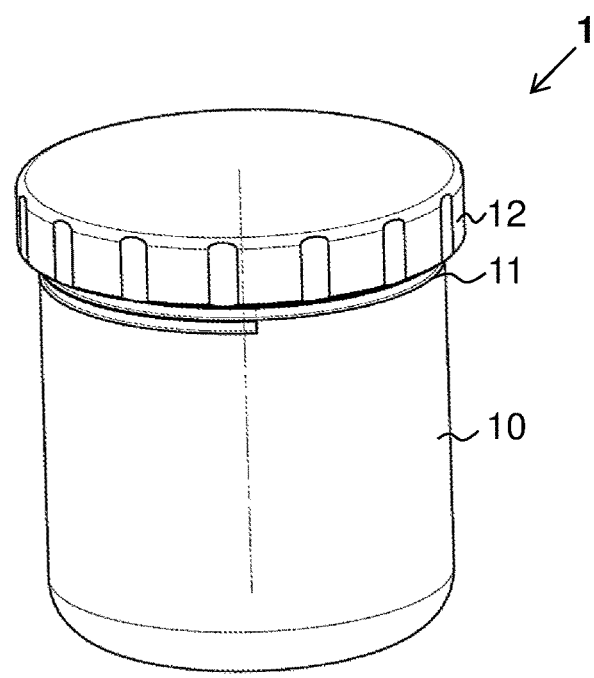
FIG. 1 shows a perspective illustration of a coffee bean container according to the invention with lid.
Figure 2:
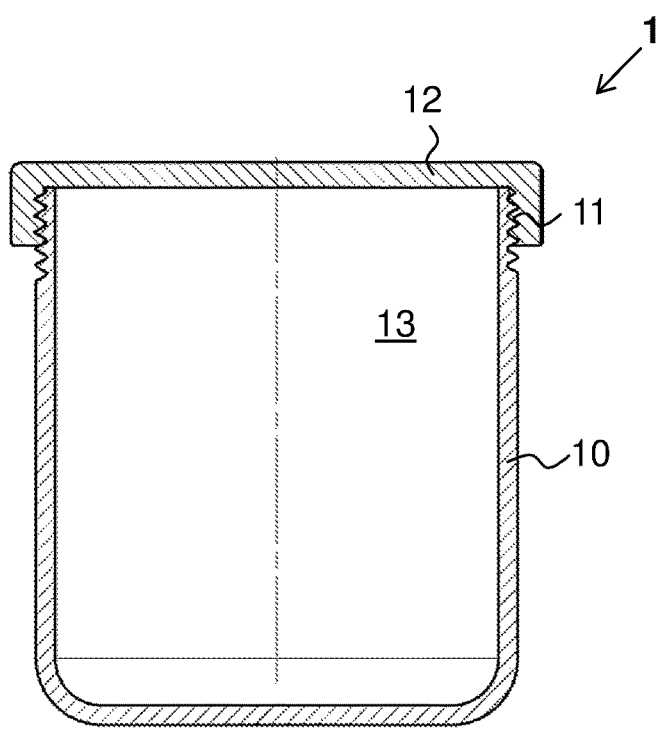
FIG. 2 shows a longitudinal section through the coffee bean container with lid as per FIG. 1.
Figure 3:
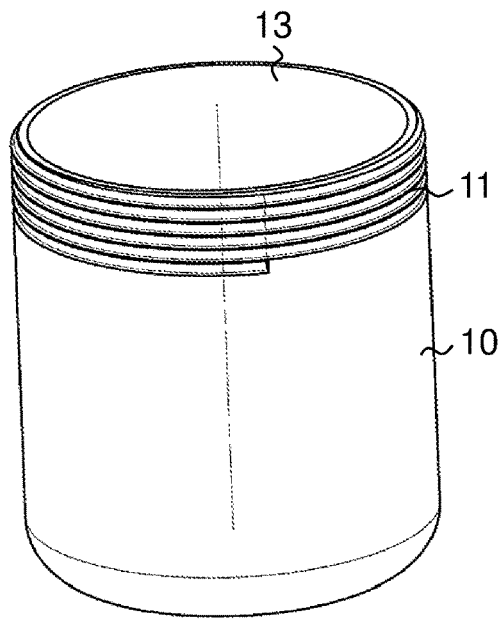
FIG. 3 shows a perspective illustration of the coffee bean container as per FIG. 1, without lid.

FIGS. 1 and 2 illustrate a can 1 according to the invention with a coffee bean container 10 and a lid 12. The coffee bean container 10 is manufactured from a rigid or semi-rigid material, for example glass, metal or a plastic, for example PET. The lid 12 is preferably manufactured from PET, another plastic or from metal. The lid 12 is round and flat. The container 10 is of circular cylindrical form with a flat base. Said container defines an interior space 13 having a constant internal diameter up to and including the outlet opening thereof. The container 10 is preferably of one-piece configuration. Said container has, at the upper free end thereof, a coupling element 11, here in the form of an external thread which can be brought into engagement with an internal thread of the lid 12. The external thread 11 can be readily recognized in FIG. 3.

Coffee beans can be stored in the coffee bean container 10. In a customary manner, the container 10 can correspondingly have writing on its outer side in order to provide information about its contents.

Figure 6:
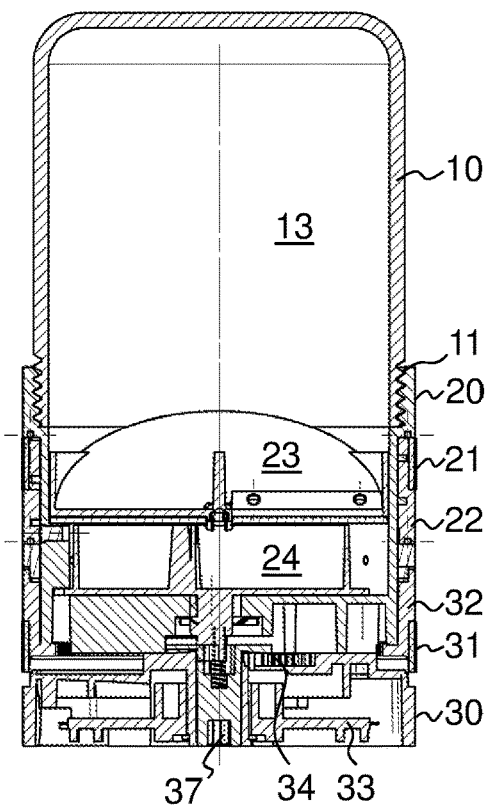
FIG. 6 shows a longitudinal section through the container module as per FIG. 5.

Instead of the connection to the lid 12, the coffee bean container 10 can be assembled with a module part to form a container module M. To this end, said container is oriented with its opening toward the top, and the module part, here being composed of a portioning device 2 and a grinding degree setting device 3, is attached to the container 10. As can be seen in FIG. 6, the module part, here a main body 20 of the portioning device 2, has a corresponding internal thread, such that the module part 2, 3, instead of the lid 12, can be screwed onto the container 10.

Figure 4:
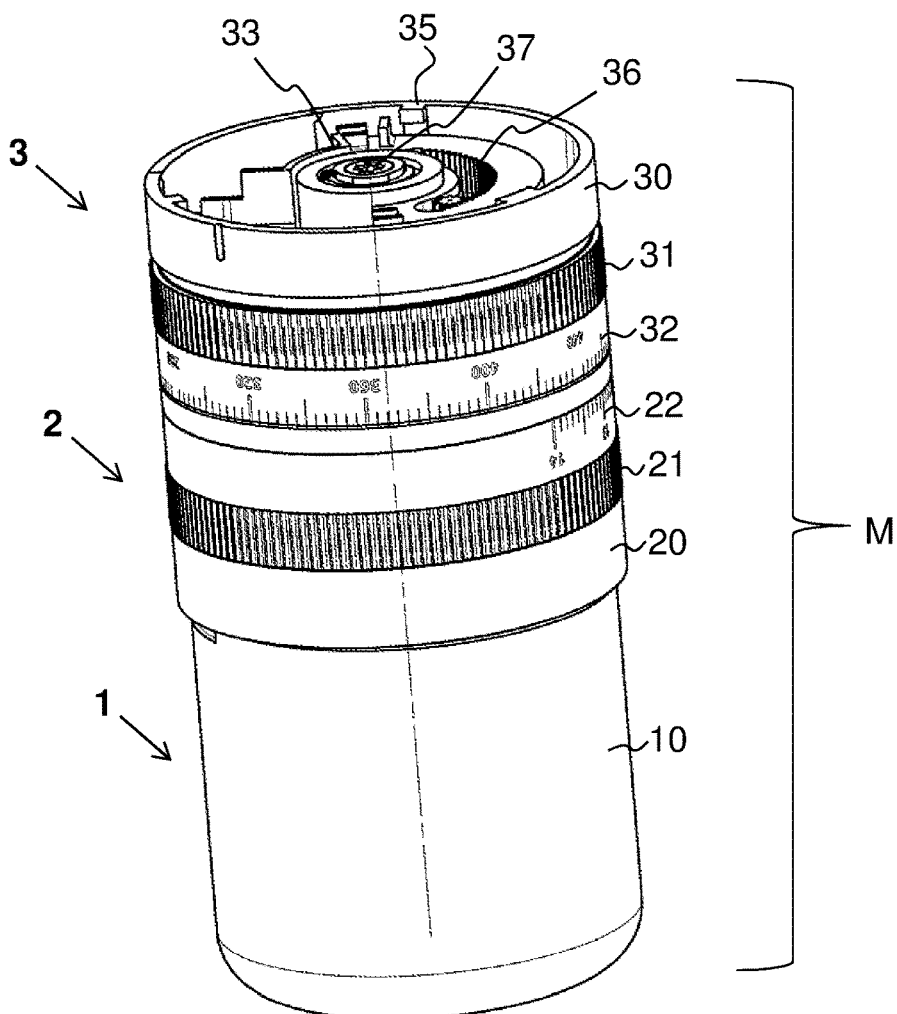
FIG. 4 shows a perspective illustration of the coffee bean container as per FIG. 1 when assembled with the portioning device and the grinding degree setting device to form a container module.
Figure 5:
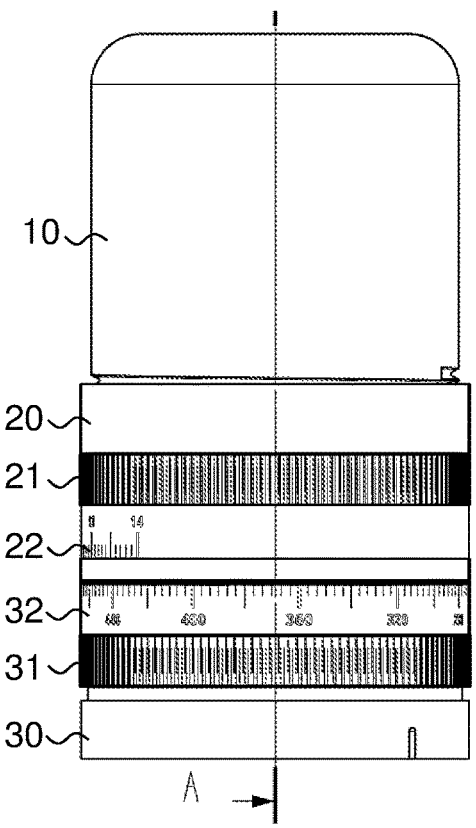
FIG. 5 shows a side view of the container module according to the invention as per FIG. 4 in a use position.

The container module M, in particular the portioning device 2 and the grinding degree setting device 3, can be readily recognized in FIGS. 4 to 6. The portioning device 2 is used to meter the coffee beans which, as per FIGS. 5 and 6, in the use position, then fall from above out of the container 10 into the portioning device 2. To this end, the beans fall onto an oblique surface 23 of the portioning device 2 and further into a metering chamber 24. The size of said metering chamber 24 can be changed by means of a first setting ring 21. The first setting ring 21 preferably surrounds the main body 20. Specifically, in this exemplary embodiment, as a result of rotation of the first setting ring 21, two rotary disks are displaced relative to one another in the longitudinal direction of the module such that the volume of the metering chamber 24 changes. In this case, the position of the main body 20 does not change, in particular it is not co-rotated. A mark 22 on the main body 20 indicates how far the first setting ring 21 has been rotated.

The grinding degree setting device 3, which is arranged under the portioning device 2 in the use position, is used, when coupled to a coffee apparatus, to correspondingly set the grinder therein. In the majority of embodiments, this means that the spacing between the grinding disks 43, 44 of the grinder 4 is changed and set according to the grinding degree setting device (see FIG. 7). The grinding degree setting device 3 likewise has a main body 30, which is preferably fixedly connected to the main body 20 of the portioning device or is even configured in one piece therewith. The two main bodies 20, 30 are preferably of circular cylindrical configuration and preferably have the same external diameter. The grinding degree setting device 3 preferably has a second setting ring 31 which surrounds the main body 30. A mark 32 on the main body 30 is used to identify the selected rotary position of the setting ring 31 relative to the main body 30.

In the interior of the main body 30 of the grinding degree setting device 3, there is arranged a mechanism which permits a pre-setting of the grinding degree and which, when coupled to a coffee apparatus, preferably transmits said pre-setting to the grinder 4 in a mechanical manner. The mechanism is preferably composed of a plurality of gear wheels and toothings, which are adjusted in terms of their position relative to one another by means of the second setting ring 31. The mechanism is not described in detail here. Various embodiments for this are explained in a comprehensive manner in the two unpublished European patent applications mentioned in the introduction. In FIG. 6, a first gear wheel of the mechanism is provided with the reference designation 34, and an internal gear rim with the reference designation 36. A rotating ring, which is used to transmit the setting to the grinder, bears the reference designation 33. A drive axle receptacle 37 is configured to be open toward the bottom and is used for connection to a drive axle 6, which can be readily recognized in FIG. 7. The drive axle receptacle 37 is connected to the portioning device 2, so that, during use, the metering chamber 24 is emptied into the grinder 4.

As can be readily recognized in FIG. 4, the container module M, here the grinding degree setting device 3, has a means for connection to a coffee apparatus. This can likewise be a thread, a snap closure, or another suitable means. In this case, the connection is effected via a bayonet closure 35.

Figure 7:
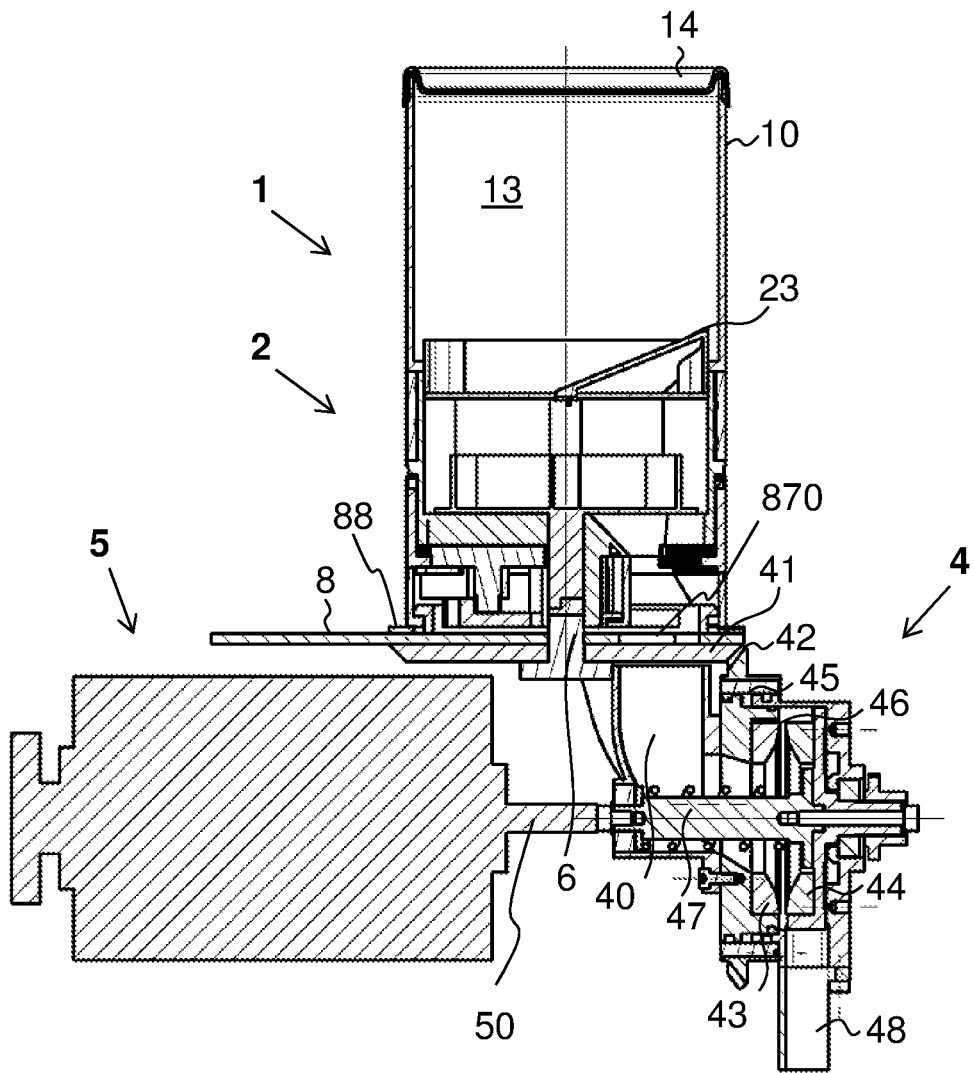
FIG. 7 shows a longitudinal section through a variant of the container module as per FIG. 6 in use with a coffee mill.

Said connection can be seen in FIG. 7. The container module M is fastened on a machine housing 8 of the coffee apparatus. The coffee bean container 10 does not correspond to the embodiment described above. It has a fixed connection to the portioning device 2 and has, at the opposite end, an upper lid 14. According to the invention, use is made not of said container 10 but rather of the container 10 as described above, and the connection to the portioning device 2 is correspondingly adapted, that is to say is configured so as to be releasable in a destruction-free manner and so as to be reconnectable.

The housing 8 has a passage opening 870, which is arranged below an outlet of the container module M, more precisely of the metering chamber 24, and thus creates a connection from the metering chamber 24 to the grinder 4. The grinder 4 having a first and a second grinding disk 43, 44 is arranged in the housing 8. The grinding disks 43, 44 are preferably arranged at a spacing from one another in the vertical direction. The spacing defines the grinding degree and thus the fineness of the coffee grounds obtained from the coffee beans. A setting disk 41 of the grinder 4 is operatively connected to the grinding degree setting device 3, preferably to the rotating ring 33. If the container module M is mounted on the housing 8, then the grinding degree setting device 3 rotates the setting ring 41. A bevel gear of the setting ring 41 engages into a beveled toothing of a union nut 42 and rotates the latter. As a result, the first grinding disk 43 which is held in the union nut is displaced relative to the second grinding disk 44. The spacing therebetween changes and the desired grinding degree is set. The changing spacing between flanges of the two grinding disks 43, 44 is provided with the reference designation 45, and the changing spacing between the two grinding disks 43, 44 themselves is designated with the reference designation 46. The two spacings have a relationship to one another.

The second grinding disk 44 is driven by means of a grinder motor 5. The grinder motor 5 is usually an electric motor. It has a motor axle 50 which rotates a conveying rotor 47 with external conveying spiral. The conveying rotor 47 drives the second grinding disk 44.

The coffee apparatus has a second electric motor (not illustrated here), which drives the drive axle 6 prior to or during actuation of the grinder 4. As a result, the metering chamber 24 is rotated, and it opens an outlet via an infeed duct 40 of the grinder 4. The metered quantity of coffee beans slides, due to gravity, into the infeed duct 40 and is conveyed, from there, between the two grinding disks 43, 44 by means of the conveying rotor 47. The resulting coffee grounds move through the outlet duct 48 into the next region of the coffee apparatus. If the apparatus is a coffee brewing machine, the coffee grounds move into the brewing region. If the apparatus is a coffee mill, then the coffee grounds move into an outlet 81 of the apparatus.

Figure 8:
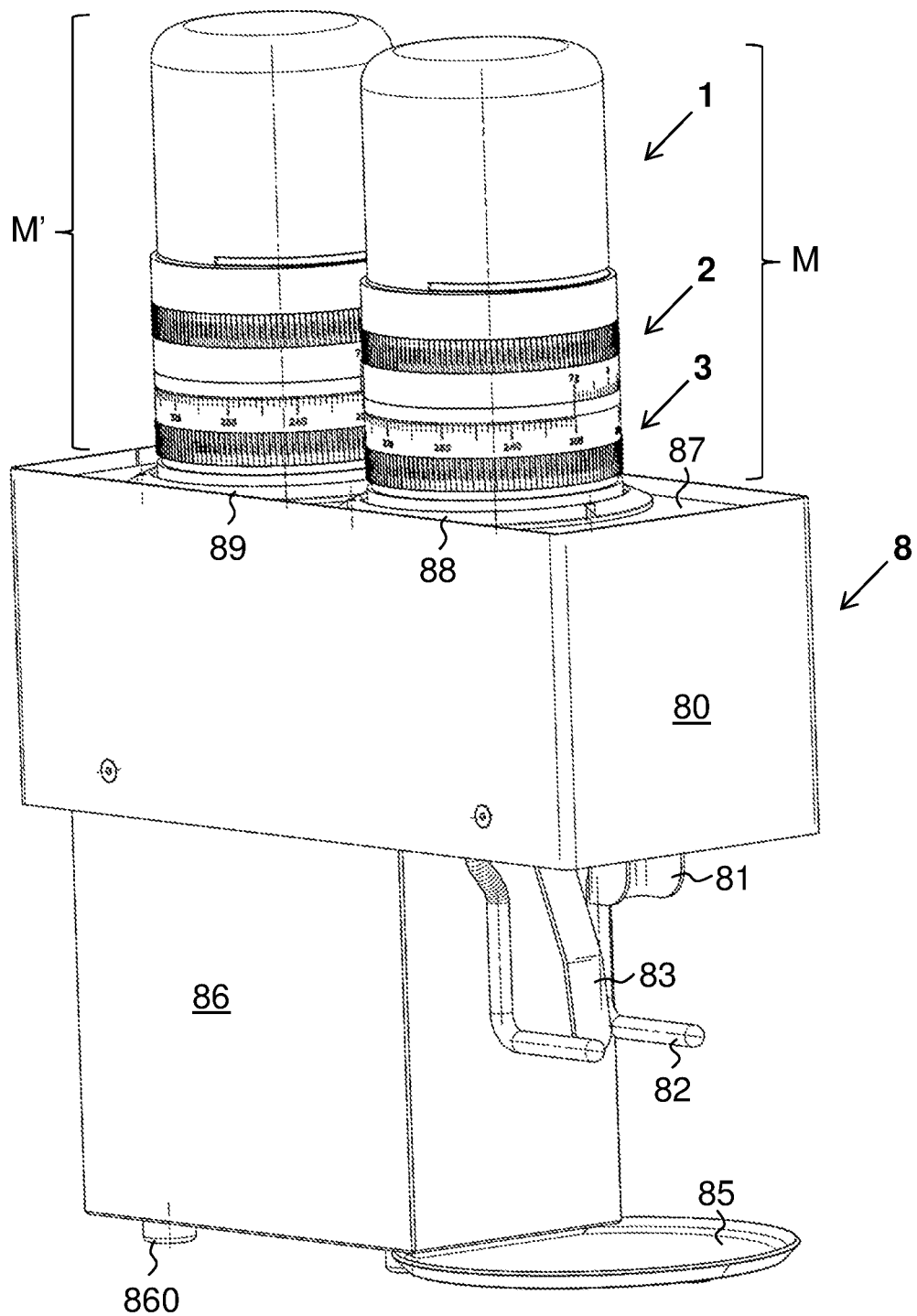
FIG. 8 shows a perspective illustration of a coffee mill with two container modules according to the invention as per FIG. 5.

FIG. 8 illustrates a preferred example of a coffee mill in combination with two container modules M, M' according to the invention. The coffee mill has the abovementioned housing 8. The housing 8 has a main body 80, in which the grinder 4, the electric motor 5, possible control devices and possible further elements of the coffee mill are arranged. The interior thereof is preferably configured correspondingly to FIG. 7.

The main body 80 preferably has a pedestal 86 with feet 860. Other types of configuration of the housing 8 are likewise possible. The main body 80 protrudes from the pedestal 86 on one side. In said region, said main body has the downwardly directed outlet 81, through which the coffee grounds are extracted. A screen support receptacle 82 is arranged below the outlet 81, in order to receive a screen support of a coffee brewing machine. Below the screen support receptacle 82, there is preferably a collecting tray 85 in order to collect possible scattered coffee grounds.

Preferably, in the region of the screen support receptacle 82, there is an actuating lever 83 which is actuated as a result of the bearing of a screen support and which, via the control device, actuates the grinder 4, that is to say activates the coffee mill.

On a top side 87 of the main body 80, there are arranged two receptacles 88, 89 for two container modules M, M'. Said receptacles are formed correspondingly to the coupling means of the container module M, M'. They are preferably of identical configuration, such that both container modules M, M' can be selectively connected to one of the two receptacles 88, 89. In this example, they are bayonet closures. The first receptacle 88 has the mentioned passage opening 870 to the infeed duct 40 and thus to the grinder 4. The second receptacle 89 is of blind configuration, that is to say it is used merely for bearing and fixing the second container module M' and it has no connection to the interior space and to the grinder of the coffee mill.

Figure 9:
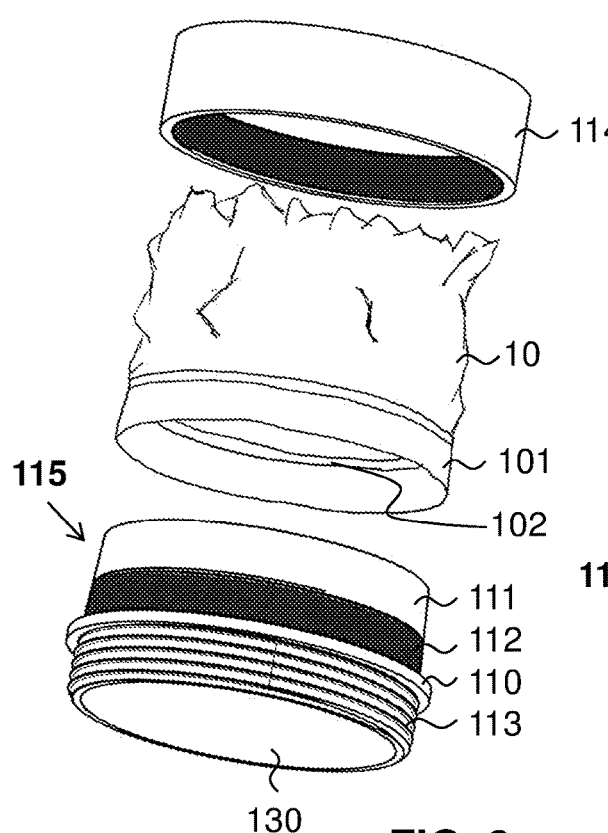
FIG. 9 shows a perspective exploded illustration of a coffee bean container according to the invention in a further embodiment.
Figure 10:
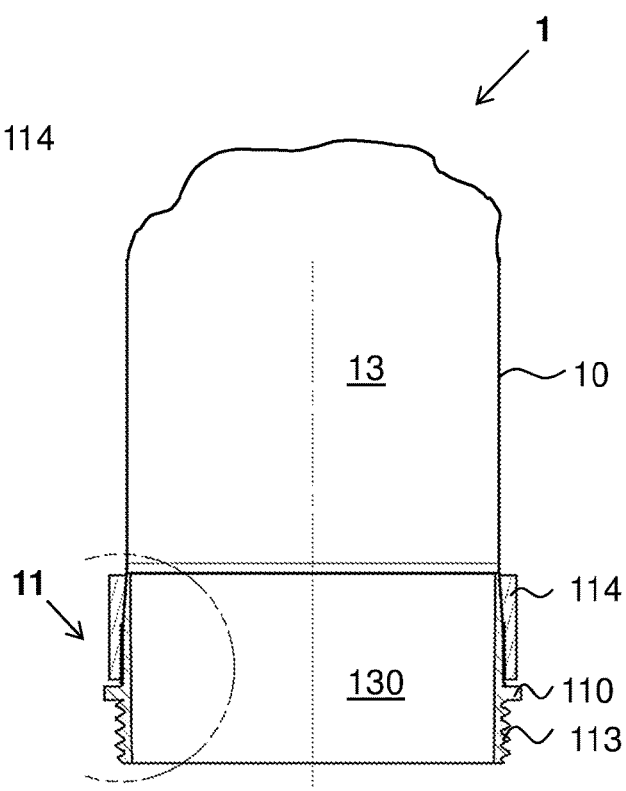
FIG. 10 shows a longitudinal section through the coffee bean container as per FIG. 9.
Figure 11:
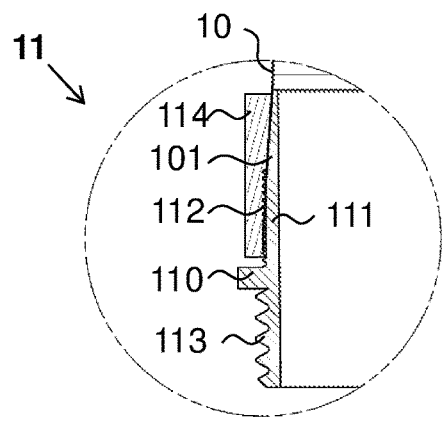
FIG. 11 shows an enlarged detail of the coffee bean container as per FIG. 10.

FIGS. 9 to 11 illustrate a further embodiment of a coffee bean container according to the invention. Here, the coffee bean container 10 is configured in the form of a flexible or soft bag. Said bag has an edge 101 which surrounds an opening which, prior to the first use, is preferably closed in an air-tight manner.

In a preferred embodiment, a compressive closure, also referred to as Minigrip, is present, as is known in the prior art for food bags, for example for nuts. To this end, the bag usually has, adjacent to the opening, a sealing rib 102 with a matching opposite groove, which makes it possible to re-close the coffee bean container in an air-tight manner. As a result of the two mutually opposite sides of the bag being pressed against one another, the sealing rib 102 engages into the groove and the bag is tightly closed again as a result. In other embodiments, the bag can be re-closed in another manner if said bag is removed from the portioning device 2, or no special means for re-closing are provided.

As has already been described in a comprehensive manner above, the coffee bean container 10 can be used in the container module, wherein the container module can be connected to a coffee apparatus, for example a coffee mill or a coffee machine, in a releasable manner.

In turn, the coupling element 11 is used for connection to the rest of the container module. In this example, the coupling element 11 is configured in the form of a separate part. It has a lower ring 115 and an upper ring 114. The lower ring 115 has, at a first end, the thread 113 for connection to the thread of the portioning device 2. Preferably, the thread 113 of the lower ring 115 is an external thread. The lower ring 115 has a circumferential flange 110, from which a conical region 111 extends as far as the second end of the lower ring 115. The conical region 111 is of planar configuration or it has ribs 112, nubs or small toothings over at least a part of the height thereof, as is the case in this example.

The lower ring 115 has a passage opening 130, which is aligned with the opening of the coffee bean container 10 and thus creates a connection between the interior space 13 of the container 10 and the metering device 2, said connection being constantly open when the container 10 has been mounted.

The upper ring 114 is, on its inner side, likewise of conical configuration and forms the counterpart to the cone of the lower ring 115. The outer side preferably runs parallel to the longitudinal center axis, such that the upper ring 114 has a thickness which decreases toward the bottom in the direction of the flange 110 of the lower ring 115. Depending on the embodiment, the inner surface of the upper ring 115 is of planar configuration or it likewise has ribs, nubs or small toothings.

During use, after the coffee bean container 10 has been opened, the edge 101 of said coffee bean container can be put over the conical region 111 and the ribs 112 of the lower ring 115. So that the coffee beans do not fall out of the bag, the opening of the bag is in this case directed upward, that is to say in the direction opposite to that illustrated in the figures. Subsequently, the upper ring 114 is pushed over the coffee bean container 10 and the conical region 111 of the lower ring 115, such that the edge 101 of the bag is clamped between the two rings 114, 115. The bag and the coupling element 11 can subsequently be jointly connected to the portioning device 2, and this also happens with an upwardly directed opening 130 of the coupling element 11, that is to say once again differently than illustrated in the figures.

In FIG. 9, the bag is illustrated in a realistic manner with a soft surface. In FIG. 10, said bag is illustrated schematically with a rectilinear surface, which, in reality, is hardly ever the case with soft bags.

In order to remove the bag again, the upper ring 114 can be pushed away from the lower ring 115 again, such that the edge 101 of the bag is freed, and said bag can be removed in a simple manner, re-closed for a subsequent use, or, if empty, discarded.

This embodiment has the advantage that the coffee beans can be offered in bags of this kind in stores, and these bags, labeled with expiration date and content information, can be used in the container module with the portioning device.

The unit according to the invention makes it possible to handle and enjoy coffee in a cost-effective and environmentally aware manner.

The invention claimed is:

1. A unit having a container module,
wherein the container module as a whole is configured for connection to a module receptacle of a housing of a coffee apparatus, the coffee apparatus being a coffee machine or a coffee mill,
wherein the container module comprises at least one coffee bean container and a portioning device, the container module being connectable to the portioning device, and the portioning device comprising a metering chamber adapted for metering coffee beans,
wherein the metering chamber has a capacity for receiving coffee beans and wherein the capacity can be varied for metering the coffee beans,
wherein the container module, when connected to the coffee apparatus, is configured to enable a delivery of coffee beans metered by the portioning device from the container module into a grinder of the coffee apparatus,
wherein the coffee bean container is closed prior to the first use and, after an opening operation, has an opening adapted to allow coffee beans in the coffee bean container to be received in the portioning device,
wherein the coffee bean container is coupled with the portioning device in a releasable and reconnectable manner, wherein a coupling element is arranged around the opening, said coupling element being used for connection to the portioning device, and wherein the opening can be closed again when the coffee bean container is separated from the portioning device.

2. The unit as claimed in claim 1, wherein the coupling element is a first thread and wherein the portioning device has a matching second thread which can be brought into engagement with the first thread.

3. The unit as claimed in claim 1, wherein the unit has a lid for closing the container.

4. The unit as claimed in claim 3, wherein the coupling element is used for connection to the lid.

5. The unit as claimed in claim 4, wherein the lid has a third thread which can be brought into engagement with the first thread.

6. The unit as claimed in claim 1, wherein the coffee bean container is closed, except for the opening.

7. The unit as claimed in claim 1, wherein the coffee bean container is of circular cylindrical configuration.

8. The unit as claimed in claim 1, wherein the coffee bean container has the shape of a jar and has, except for a bottom region, a constant internal diameter.

9. The unit as claimed in claim 1, wherein the coffee bean container is manufactured from a stiff material.

10. The unit as claimed in claim 1, wherein the coffee bean container is a flexible or soft bag and wherein the coupling element has a ring with a thread for connection to the portioning device.

11. The unit as claimed in claim 1, wherein the portioning device substantially has a circular cylindrical outer contour.

12. The unit as claimed in claim 1, wherein the unit comprises a first setting means, wherein the portioning device has the first setting means, by means of which a metering of the coffee beans can be manually selected.

13. The unit as claimed in claim 1, wherein the container module furthermore has a grinding degree setting device for the selectable setting of the grinding degree, wherein, when the container module is connected to the grinder, the grinding degree setting device affects the grinder.

14. The unit as claimed in claim 13, wherein the portioning device is arranged between the coffee bean container and the grinding degree setting device.

15. The unit as claimed in claim 13, wherein the unit comprises a second setting means, wherein the grinding degree setting device has the second setting means, by means of which the grinding degree can be manually selected.

16. The unit as claimed in claim 1, wherein the container module has a substantially cylindrical outer contour.

17. A coffee bean container and a lid of a unit as claimed in claim 1, wherein the coffee bean container is of circular cylindrical and one-piece configuration, having a closed base and the opening opposite the base, wherein the opening is surrounded by an external thread, and the lid has a matching internal thread.

18. A coffee bean container of a unit as claimed in claim 1, wherein the coffee bean container is a bag having an edge which surrounds an opening of the coffee bean container, wherein the coupling element has a lower ring for connection to the portioning device and an upper ring and wherein the edge of the coffee bean container, in the open state of the coffee bean container, is held in a clamped manner between the upper and the lower ring.

* * * * *